US009872341B2

(12) United States Patent
Criminale et al.

(10) Patent No.: US 9,872,341 B2
(45) Date of Patent: Jan. 16, 2018

(54) CONSOLIDATED FILTER ARRANGEMENT FOR DEVICES IN AN RF ENVIRONMENT

(71) Applicant: Applied Materials, Inc., Santa Clara, CA (US)

(72) Inventors: Phillip Criminale, Livermore, CA (US); Steve E. Babayan, Los Altos, CA (US); Scott Edmonson, San Jose, CA (US); Phillip R. Sommer, Newark, CA (US); Dan A. Marohl, San Jose, CA (US); Chris Blank, Gilroy, CA (US)

(73) Assignee: Applied Materials, Inc., Santa Clara, CA (US)

( * ) Notice: Subject to any disclaimer, the term of this patent is extended or adjusted under 35 U.S.C. 154(b) by 381 days.

(21) Appl. No.: 14/555,435

(22) Filed: Nov. 26, 2014

(65) Prior Publication Data

US 2016/0149482 A1 May 26, 2016

(51) Int. Cl.
*H05B 3/68* (2006.01)
*H05B 3/00* (2006.01)
(Continued)

(52) U.S. Cl.
CPC .............. *H05B 3/0047* (2013.01); *H02J 3/14* (2013.01); *H02J 13/0075* (2013.01);
(Continued)

(58) Field of Classification Search
CPC .......... H05B 3/0047; H05B 3/68; H05B 3/16; H05B 3/06; H05B 1/0233; H02J 3/14;
(Continued)

(56) References Cited

U.S. PATENT DOCUMENTS 5,103,367 A  4/1992 Horwitz et al.
5,190,703 A  3/1993 Rose et al.
(Continued)

FOREIGN PATENT DOCUMENTS

EP   2662996 A1   11/2013

OTHER PUBLICATIONS

International Search Report and Written Opinion of the International Searching Authority for PCT Application No. PCT/US2015/059326 dated Feb. 18, 2016.
(Continued)

*Primary Examiner* — Sang Y Paik
(74) *Attorney, Agent, or Firm* — Lowenstein Sandler LLP

(57) ABSTRACT

A system includes a plurality of elements that are to operate in a radio frequency (RF) environment. The system further includes a plurality of switching devices to operate in the RF environment, each of the plurality of switching devices to control power to at least one of the plurality of elements, wherein the plurality of switching devices are coupled to a power line that is to provide power from outside the RF environment. A filter is coupled to the power line to filter out RF noise introduced into the power line by the RF environment. The system further includes a converter, coupled to the one or more switching devices, to operate in the RF environment and to provide a non-conductive communication link between the one or more switching devices and a controller outside of the RF environment.

11 Claims, 8 Drawing Sheets

(51) Int. Cl.
*H02J 3/14* (2006.01)
*H05B 1/02* (2006.01)
*H02M 5/257* (2006.01)
*H02J 13/00* (2006.01)
*H02M 1/092* (2006.01)

(52) U.S. Cl.
CPC ........ *H02M 5/2576* (2013.01); *H05B 1/0233* (2013.01); *H02J 2003/143* (2013.01); *H02M 1/092* (2013.01); *Y02B 70/3225* (2013.01); *Y02B 90/2653* (2013.01); *Y04S 20/222* (2013.01); *Y04S 40/126* (2013.01)

(58) Field of Classification Search
CPC ........... H02J 13/0075; H02J 2003/143; H02M 5/2576; H02M 1/092; Y02B 70/3225; Y02B 90/2653; Y04S 20/222; Y04S 40/126; F24C 7/00; F24C 7/082; F24C 15/106; H01L 21/67103; H01L 21/67248
USPC .......... 219/392, 443.1, 444.1, 448.12, 458.1, 219/482, 483, 485, 494, 539, 541
See application file for complete search history.

(56) References Cited

U.S. PATENT DOCUMENTS

| | | | |
|---|---|---|---|
| 5,571,366 A | 11/1996 | Ishii et al. | |
| 5,585,766 A | 12/1996 | Shel | |
| 5,737,177 A | 4/1998 | Mett et al. | |
| 5,770,982 A | 6/1998 | Moore | |
| 5,804,802 A | 9/1998 | Card et al. | |
| 5,812,361 A | 9/1998 | Jones et al. | |
| 6,270,618 B1 | 8/2001 | Nakano et al. | |
| 6,469,283 B1 | 10/2002 | Burkhart et al. | |
| 6,703,080 B2 * | 3/2004 | Reyzelman | H01J 37/32082 118/723 E |
| 7,116,566 B2 | 10/2006 | Yang et al. | |
| 7,777,152 B2 | 8/2010 | Todorov et al. | |
| 7,970,483 B2 | 6/2011 | Raoux et al. | |
| 8,461,674 B2 | 6/2013 | Gaff et al. | |
| 8,546,732 B2 | 10/2013 | Singh | |
| 8,587,113 B2 | 11/2013 | Gaff et al. | |
| 8,624,168 B2 | 1/2014 | Gaff et al. | |
| 8,629,370 B2 | 1/2014 | Tavassoli et al. | |
| 8,637,794 B2 | 1/2014 | Singh et al. | |
| 8,884,194 B2 | 11/2014 | Singh et al. | |
| 2001/0038122 A1 | 11/2001 | Matsuzaki et al. | |
| 2002/0100557 A1 | 8/2002 | Li et al. | |
| 2003/0221853 A1 | 12/2003 | Shiozawa | |
| 2004/0081439 A1 | 4/2004 | Kholodenko et al. | |
| 2005/0011656 A1 | 1/2005 | Patterson | |
| 2005/0093730 A1 | 5/2005 | Mourrier | |
| 2006/0186922 A1 | 8/2006 | Rozsypal | |
| 2007/0114949 A1 | 5/2007 | Yu et al. | |
| 2008/0035306 A1 * | 2/2008 | White | C23C 16/4586 165/61 |
| 2009/0184854 A1 | 7/2009 | Trumbo et al. | |
| 2010/0273277 A1 | 10/2010 | Qin | |
| 2010/0296671 A1 | 11/2010 | Khoury et al. | |
| 2012/0048467 A1 | 3/2012 | Mahadeswaraswamy et al. | |
| 2012/0097661 A1 * | 4/2012 | Singh | H01L 21/67109 219/446.1 |
| 2012/0273162 A1 | 11/2012 | Mahadeswaraswamy | |
| 2013/0220989 A1 * | 8/2013 | Pease | H01L 21/67103 219/458.1 |
| 2014/0045337 A1 | 2/2014 | Singh et al. | |
| 2014/0047705 A1 | 2/2014 | Singh et al. | |
| 2014/0048529 A1 * | 2/2014 | Pease | H05B 1/0202 219/494 |
| 2014/0096909 A1 | 4/2014 | Singh et al. | |
| 2014/0154819 A1 * | 6/2014 | Gaff | H01L 21/67109 438/17 |
| 2014/0220709 A1 | 8/2014 | Kimura et al. | |
| 2015/0019677 A1 | 1/2015 | Chen et al. | |
| 2015/0170977 A1 | 6/2015 | Singh | |
| 2015/0332942 A1 * | 11/2015 | Peh | H01L 21/67109 165/253 |

OTHER PUBLICATIONS

Final Office Action for U.S. Appl. No. 14/555,424 dated May 6, 2016.

Non-Final Office Action for U.S. Appl. No. 14/555,424 dated Oct. 5, 2016.

* cited by examiner

CONSOLIDATED FILTER ARRANGEMENT FOR DEVICES IN AN RF ENVIRONMENT

TECHNICAL FIELD

Implementations described herein generally relate to semiconductor manufacturing and more particularly to controlling devices that operate in a destructive radio frequency (RF) environment (also referred to as an RF hot environment) that is capable of damaging electronic and electrical components.

BACKGROUND

Many processes for manufacturing of semiconductor devices, photovoltaics, displays, and so on are performed in destructive RF environments that are capable of damaging electronic components. Traditionally, the electrical components that control the processes are located outside of the destructive RF environments, with RF filters disposed between these electrical components and lines going into the RF environment. However, this causes there to be a separate filter for each of the electrical components (e.g., a separate filter for each switch that switches on and off a heating element disposed within the destructive RF environment). As the number of electrical components used to control elements within the destructive environment increase, the number of filters likewise increases. Such filters are typically expensive and large.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION OF EMBODIMENTS

Implementations described herein provide a switching system that includes multiple switches that operate inside of a destructive RF environment (also referred to herein as an RF hot environment). The multiple switches are all coupled to the same power line, with the power line being coupled to a filter that filters out RF noise introduced into the power line by the RF environment. The multiple switches are coupled to a converter that receives switching signals from a processing device external to the RF environment over a non-conductive communication link, converts the switching signals into electrical switching signals, and provides the switching signals to the switches. By locating the switches in the RF environment and providing a common power line connection to the multiple switches, the number of filters used to filter out RF noise and protect electrical components outside of the RF environment is reduced. The filters are expensive and large. Thus, by reducing the number of filters a cost of a machine (e.g., semiconductor processing equipment) that uses the switching system is reduced. Additionally, a size of the machine may be reduced and/or space may be made available in the machine for other components.

Implementations described herein also provide a control architecture for controlling switches, processing devices and other devices in an RF environment as well as for controlling switches, processing devices and other devices that are external to the RF environment. The control architecture may be used to control, for example, both the above described switching system as well as pulse width modulation (PWM) circuits and/or other processing devices that are within an RF environment. The control architecture enables real time control of logic devices inside of the RF environment and outside of the RF environment with significantly reduced cost and complexity as compared to traditional designs.

In one embodiment, the control architecture includes a processing device coupled to a first converter, where the processing device and the first converter are external to a destructive RF environment. The control architecture further includes at least one pulse width modulation (PWM) circuit coupled to a second converter, where the PWM circuit and the second converter are internal to the destructive RF environment. The processing device generates commands, which the first converter converts from a conductive format into an additional format (e.g., an optical format) that is transmissible over a non-conductive communication link. The second converter converts the commands from the additional format back into the conductive format and provides the commands to the PWM circuit. The commands may update a setting of the PWM circuit. The PWM circuit may then control one or more elements inside the destructive RF environment without receiving any further commands from the processing device.

Figure 1:
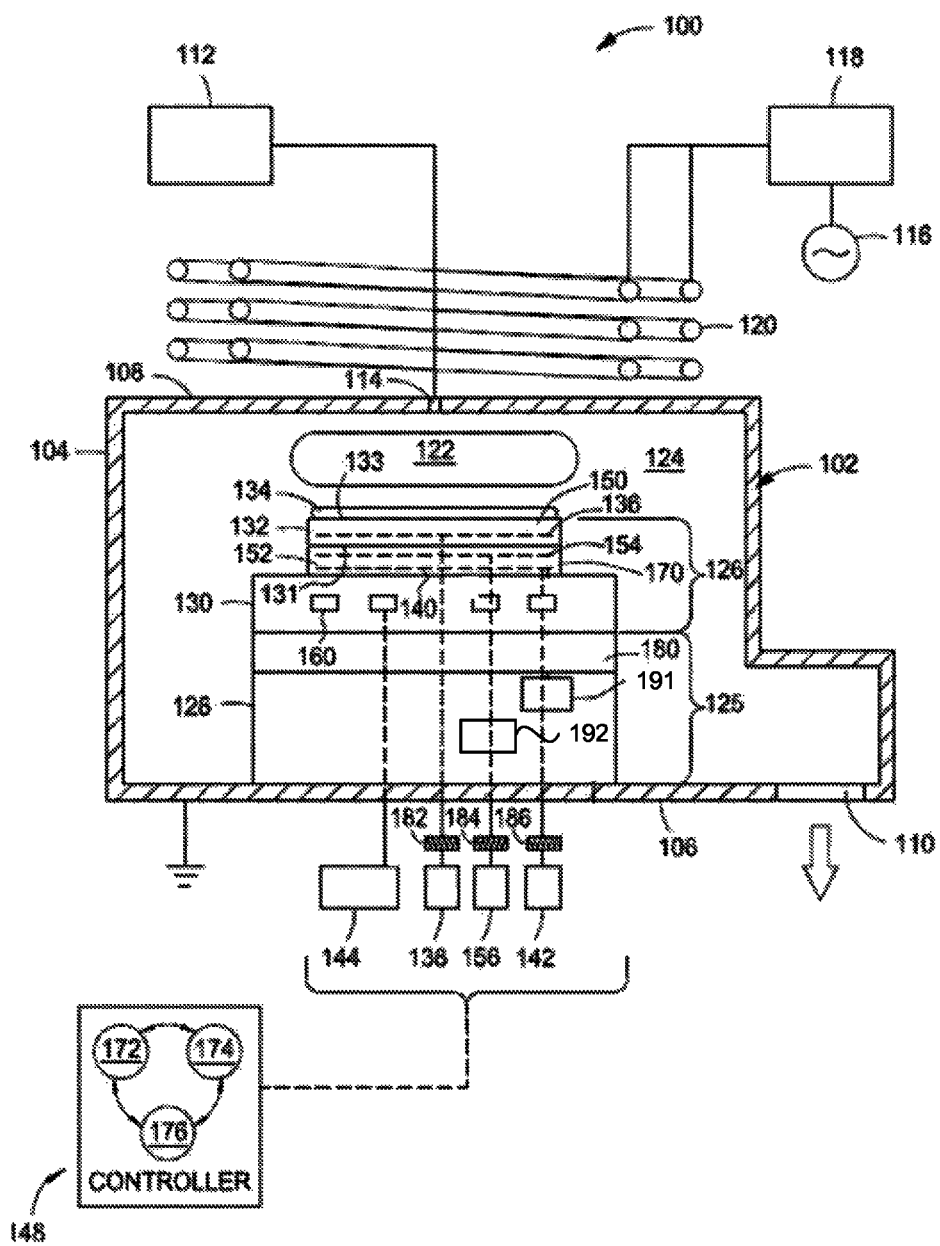
FIG. 1 is a cross-sectional schematic side view of a processing chamber having one embodiment of a consolidated filter arrangement for devices in an RF environment and for a control architecture for devices in the RF environment.

FIG. 1 is a cross-sectional schematic view of an example processing chamber 100 having both a simplified control architecture and a simplified switching system. The processing chamber 100 may be, for example, a plasma treatment chamber, an etch processing chamber, an annealing chamber, a physical vapor deposition chamber, a chemical vapor deposition chamber, or an ion implantation chamber. The processing chamber 100 includes a grounded chamber body 102. The chamber body 102 includes walls 104, a bottom 106 and a lid 108 which enclose an internal volume 124. A substrate support assembly 126 is disposed in the internal volume 124 and supports a substrate 134 disposed thereon during processing.

The walls 104 of the processing chamber 100 include an opening (not shown) through which the substrate 134 may be robotically transferred into and out of the internal volume 124. A pumping port 110 is formed in one of the walls 104 or the bottom 106 of the chamber body 102 and is fluidly connected to a pumping system (not shown). The pumping system may be utilized to maintain a vacuum environment within the internal volume 124 of the processing chamber 100, and may additionally remove processing byproducts.

A gas panel 112 provides process and/or other gases to the internal volume 124 of the processing chamber 100 through one or more inlet ports 114 formed through at least one of the lid 108 or walls 104 of the chamber body 102. The process gases provided by the gas panel 112 may be energized within the internal volume 124 to form a plasma 122 utilized to process the substrate 134 disposed on the substrate support assembly 126. The process gases may be energized by RF power inductively coupled to the process gases from a plasma applicator 120 positioned outside the chamber body 102. In the embodiment depicted in FIG. 1, the plasma applicator 120 is a pair of coaxial coils coupled through a matching circuit 118 to an RF power source 116.

The substrate support assembly 126 generally includes at least a substrate support 132. The substrate support 132 may be a vacuum chuck, an electrostatic chuck, a susceptor, or other workpiece support surface. In the embodiment of FIG. 1, the substrate support 132 is an electrostatic chuck and will be described hereinafter as the electrostatic chuck 132. The substrate support assembly 126 may additionally include a heater assembly 170. The substrate support assembly 126 may also include a cooling base 130. The cooling base may alternately be separate from the substrate support assembly 126. The substrate support assembly 126 may be removably coupled to a support pedestal 125. The support pedestal 125, which may include a pedestal base 128 and a facility plate 180, is mounted to the chamber body 102. The substrate support assembly 126 may be periodically removed from the support pedestal 125 to allow for refurbishment of one or more components of the substrate support assembly 126.

The facility plate 180 is configured to accommodate one or more driving mechanisms configured to raise and lower one or more lift pins. Additionally, the facility plate 180 is configured to accommodate fluid connections from the electrostatic chuck 132 and/or the cooling base 130. The facility plate 180 is also configured to accommodate electrical connections from the electrostatic chuck 132 and the heater assembly 170. The myriad of connections may run externally or internally of the substrate support assembly 126.

The electrostatic chuck 132 has a mounting surface 131 and a workpiece surface 133 opposite the mounting surface 131. The electrostatic chuck 132 generally includes a chucking electrode 136 embedded in a dielectric body 150. The chucking electrode 136 may be configured as a mono polar or bipolar electrode, or other suitable arrangement. The chucking electrode 136 is coupled through an RF filter 182 to a chucking power source 138 which provides an RF or DC power to electrostatically secure the substrate 134 to the upper surface of the dielectric body 150. The RF filter 182 prevents RF power utilized to form a plasma 122 within the processing chamber 100 from damaging electrical equipment or presenting an electrical hazard outside the chamber. The dielectric body 150 may be fabricated from a ceramic material, such as MN or $Al_2O_3$. Alternately, the dielectric body 150 may be fabricated from a polymer, such as polyimide, polyetheretherketone, polyaryletherketone and the like. In some instances, the dielectric body is coated with a plasma resistant ceramic coating, such as Yttria, $Y_3Al_5O_{12}$ (YAG), and so on.

The workpiece surface 133 of the electrostatic chuck 132 may include gas passages (not shown) for providing backside heat transfer gas to the interstitial space defined between the substrate 134 and the workpiece surface 133 of the electrostatic chuck 132. The electrostatic chuck 132 may also include lift pin holes for accommodating lift pins (both not shown) for elevating the substrate 134 above the workpiece surface 133 of the electrostatic chuck 132 to facilitate robotic transfer into and out of the processing chamber 100.

The temperature controlled cooling base 130 is coupled to a heat transfer fluid source 144. The heat transfer fluid source 144 provides a heat transfer fluid, such as a liquid, gas or combination thereof, which is circulated through one or more conduits 160 disposed in the cooling base 130. The fluid flowing through neighboring conduits 160 may be isolated to enable local control of the heat transfer between the electrostatic chuck 132 and different regions of the cooling base 130, which assists in controlling a lateral temperature profile of the substrate 134.

A fluid distributor (not shown) may be fluidly coupled between an outlet of the heat transfer fluid source 144 and the temperature controlled cooling base 130. The fluid distributor operates to control the amount of heat transfer fluid provided to the conduits 160. The fluid distributor may be disposed outside of the processing chamber 100, within the pixelated substrate support assembly 126, within the pedestal base 128 or other suitable location.

The heater assembly 170 may include one or more main resistive heating elements 154 and/or multiple auxiliary heating elements 140 embedded in a body 152 (e.g., of the electrostatic chuck). The main resistive heating elements 154 may be provided to elevate the temperature of the substrate support assembly 126 and the supported substrate 134 to a temperature specified in a process recipe. The auxiliary heating elements 140 may provide localized adjustments to the temperature profile of the substrate support assembly 126 generated by the main resistive heating elements 154. Thus, the main resistive heating elements 154 operate on a globalized macro scale while the auxiliary heating elements operate on a localized micro scale. The main resistive heating elements 154 are coupled to a switching module 192 that includes one or more switching devices. The switching module 192 is coupled through an RF filter 184 to a main heater power source 156. The switching devices in the switching module 192 switch on and off the flow of power to the main resistive heating elements 154 based on signals received from a controller 148. The power source 156 may provide up to 900 watts or more power to the main resistive heating elements 154.

The controller 148 may control the operation of the main heater power source 156, which is generally set to heat the substrate 134 to about a predefined temperature. In one embodiment, the main resistive heating elements 154 include multiple laterally separated temperature zones. The controller 148 enables one or more temperature zones of the main resistive heating elements 154 to be preferentially heated relative to the main resistive heating elements 154 located in one or more of the other temperature zones. For example, the main resistive heating elements 154 may be arranged concentrically into multiple separated temperature zones.

The auxiliary heating elements 140 are coupled through an RF filter 186 to an auxiliary heater power source 142. The auxiliary heater power source 142 may provide 10 watts or less power to the auxiliary heating elements 140. In one embodiment, the auxiliary heater power source 142 generates direct current (DC) power and the main heater power source 156 provides alternating current (AC). Alternatively, both the auxiliary heater power source 142 and the main heater power source 156 may provide AC power or DC power. In one embodiment, the power supplied by the auxiliary heater power source 142 is an order of magnitude less than the power supplied by the main heater power source 156 of the main resistive heating elements. The auxiliary heating elements 140 may additionally be coupled to an internal controller 191. The internal controller 191 may be located within or external to the substrate support assembly 126. The internal controller 191 may manage the power provided from the auxiliary heater power source 142 to individual or groups of auxiliary heating elements 140 in order to control the heat generated locally at each of the auxiliary heating elements 140 distributed laterally across the substrate support assembly 126. The internal controller 202 is configured to independently control an output of or more of the auxiliary heating elements 140 relative to others of the auxiliary heating elements 140.

In one embodiment, the one or more main resistive heating elements 154, and/or the auxiliary heating elements 140, may be formed in the electrostatic chuck 132. The internal controller 191 may be disposed adjacent to or near the cooling base and may selectively control individual auxiliary heating elements 140.

The electrostatic chuck 132 may include one or more temperature sensors (not shown) for providing temperature feedback information to the controller 148, for controlling the power applied by the main heater power source 156 to the main resistive heating elements 154, for controlling the operations of the cooling base 130, and/or for controlling the power applied by the auxiliary heater power source 142 to the auxiliary heating elements 140.

The temperature of the surface for the substrate 134 in the processing chamber 100 may be influenced by the evacuation of the process gasses by the pump, a slit valve door, the plasma 122, and other factors. The cooling base 130, the one or more main resistive heating elements 154, and the auxiliary heating elements 140 all help to control the surface temperature of the substrate 134.

In one embodiment of a two zone configuration of main resistive heating elements 154, the main resistive heating elements 154 may be used to heat the substrate 134 to a temperature suitable for processing with a variation of about +/−10 degrees Celsius from one zone to another. In another embodiment of a four zone assembly for the main resistive heating elements 154, the main resistive heating elements 154 may be used to heat the substrate 134 to a temperature suitable for processing with a variation of about +/−1.5 degrees Celsius within a particular zone. Each zone may vary from adjacent zones from about 0 degrees Celsius to about 20 degrees Celsius depending on process conditions and parameters. In some instances, a half a degree variation of the surface temperature for the substrate 134 may result in as much as a nanometer difference in the formation of structures therein. The auxiliary heating elements 140 may be used to improve the temperature profile of the surface of the substrate 134 produced by the main resistive heating elements 154 by reducing variations in the temperature profile to about +/−0.3 degrees Celsius. The temperature profile may be made uniform or to vary precisely in a predetermined manner across regions of the substrate 134 through the use of the auxiliary heating elements 140 to obtain desired results.

The internal volume 124 of the processing chamber 100 is a destructive RF environment (also referred to as an RF hot environment). The destructive RF environment will damage or destroy electrical components that are not protected (e.g., by careful configuration and layout of the electrical components in the RF environment or by filtering out RF noise). The switching module 192 and the internal controller 191 are both located within the internal volume 124, and are thus exposed to the destructive RF environment. To protect the electrical components in the switching module 192 and the internal controller 191, components of the switching module 192 and internal controller 191 are maintained at an approximately equal potential and are not grounded.

The switching module 192 may be mounted to a circuit board (e.g., a printed circuit board). The circuit board (including components of the switching module 192) may be maintained at a fixed potential. Each area of the circuit board may thus have the same potential. By maintaining the circuit board and all of its components at a fixed potential, damage from the RF environment may be prevented. The internal controller 191 may similarly be mounted to a circuit board (e.g., a printed circuit board). The circuit board (including components of the internal controller 191) may be maintained at a fixed potential. Each area of the circuit board may thus have the same potential. By maintaining the circuit board and all of its components at a fixed potential, damage from the RF environment may be prevented. A power line that provides power to the internal controller 191 and auxiliary heating elements 140 is protected by filter 186. Additionally, a power line that provides power to switching module 192 and main resistive heating elements 154 is protected by filter 184.

External controller 148 is coupled to the processing chamber 100 to control operation of the processing chamber 100 and processing of the substrate 134. The external controller 148 includes a general-purpose data processing system that can be used in an industrial setting for controlling various sub-processors and sub-controllers. Generally, the external controller 148 includes a central processing unit (CPU) 172 in communication with memory 174 and input/output (I/O) circuitry 176, among other common components. Software commands executed by the CPU of the controller 148 cause the processing chamber to, for example, introduce an etchant gas mixture (i.e., processing gas) into the internal volume 124, form the plasma 122 from the processing gas by application of RF power from the plasma applicator 120, and etch a layer of material on the substrate 134.

The controller 148 may include one or more converters that convert commands and switching signals from a conductive format to a non-conductive format. In one embodiment, controller 148 includes an optical converter that converts commands and switching signals into an optical format for transmission over a fiber optic interface. Switching module 192 may include another converter that converts switching signals received from the controller 148 back into a conductive (e.g., electrical) format and that then provides the switching signal to the switching devices. Similarly, internal controller 191 may include a similar converter that converts commands from the non-conductive format back into the conductive format and provides the commands to one or more processing devices included in the internal controller 191. In one embodiment, the processing devices are pulse width modulation (PWM) circuits. By sending switching signals and commands from the controller 148 to the switching module 192 and internal controller 191 over a non-conductive interface, the controller 148 is protected from RF noise.

Figure 2:
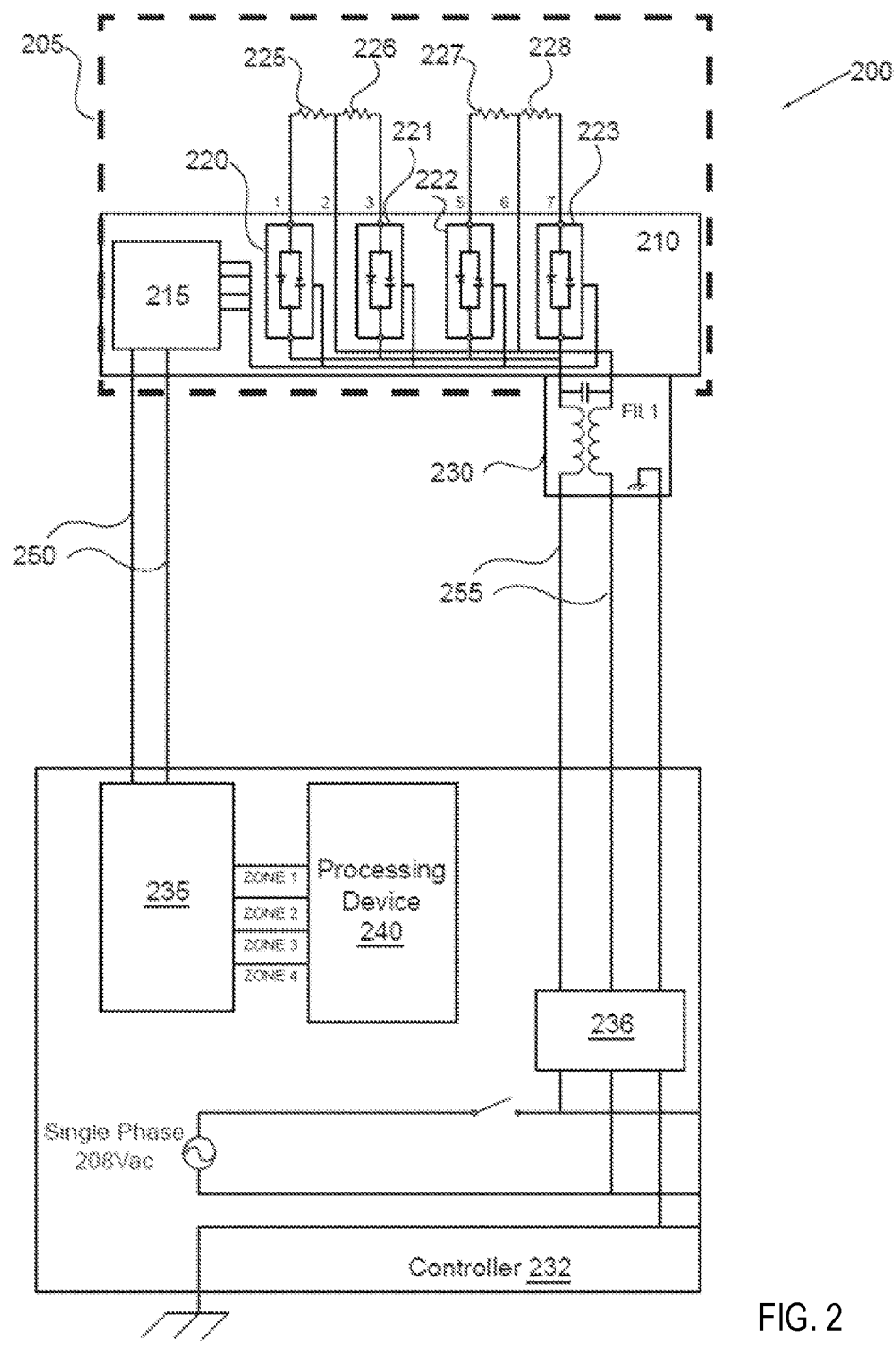
FIG. 2 is a block diagram for a switching system including a consolidated filter arrangement for devices in an RF environment, in accordance with one embodiment.

FIG. 2 is a block diagram for a switching system 200 that includes a consolidated filter arrangement for devices in an RF environment, in accordance with one embodiment. The switching system 200 includes an external controller 232 and a switching module 210. The switching module 210 resides inside of an RF environment 205 (e.g., a destructive RF environment) and the external controller 232 resides outside of the RF environment 205.

External controller 232 is configured to provide power to the switching module 210 and to provide switching signals to the switching module 210. The power is provided to the switching module 210 over a power line 255 and through a single filter 230. In one embodiment, external controller 232 includes a circuit breaker 238 that protects the power line 255, a filter 230, and connected electrical components. In one embodiment, external controller 232 provides single phase power (e.g., 208 V AC power) to the switching module 210. Alternatively, external controller 232 may provide three phase power to switching module 210.

The single filter 230 is configured to filter out RF noise that would otherwise be introduced to the power line 255 by the RF environment 205. In a conventional arrangement, switches are located outside of the RF environment and are separated from the RF environment by filters. In conventional arrangements, a separate filter is used for each switch. In contrast, the switching system 200 includes a single power line 255 (e.g., a single power line with a hot lead, a neutral lead and a ground lead) and a single filter 230. Use of just a single filter can significantly reduce a cost and size of the switching system.

External controller 232 further includes a processing device 240 and a converter 235. The processing device 240 may be a proportional-integral-derivative (PID) controller, a microprocessor (e.g., a complex instruction set computing (CISC) microprocessor, reduced instruction set computing (RISC) microprocessor, very long instruction word (VLIW) microprocessor), a PID microprocessor, a central processing unit, an application specific integrated circuit (ASIC), a field programmable gate array (FPGA), a digital signal processor (DSP), or the like. Processing device 240 may also be multiple processing devices of the same type or of different types. For example, processing device 240 may be a combination of a PID controller and a microprocessor or of multiple microprocessors.

The processing device 240 is coupled to a converter 235 via one or more conductive connections. In one embodiment, processing device 240 has a parallel connection to the converter 235, with a different line of the parallel connection corresponding to each switch in the switching module 210. In the illustrated example the switching controller 210 includes four switches 220, 221, 222, 223. Accordingly, processing device 240 has a parallel connection to converter 235 with four separate lines. More or fewer lines may be used in such an embodiment in accordance with the number of switches included in switching module 210. Each line may be used to transmit a switching signal that will be used to control the switching on and off of a particular switch. Alternatively, processing device 240 may have a serial connection to converter 235, in which multiple switching signals may be multiplexed and sent over one or more lines.

Converter 235 converts the switching signals from a conductive format (e.g., from electrical signals) into a non-conductive format that is transmissible over a non-conductive communication link 250. The non-conductive communication link 250 is used rather than a conductive communication link in order to maintain an electrical separation between the processing device 240 and the components in the RF environment 205. This prevents RF noise from traveling through control circuitry on the external controller 232 and damaging the external controller 232. In one embodiment, converter 235 is an optical converter, the non-conductive format is an optical format (e.g., optical signals), and non-conductive communication link 250 is a fiber optic interface such as a fiber optic cable. The fiber optic interface is not subject to electromagnetic interference or radio frequency (RF) energy. Thus, an RF filter to protect the controller processing device 240 from RF energy transmission may be omitted, thereby allowing more space for routing other utilities. In one embodiment, the converter 235 multiplexes signals directed to multiple different switches and sends these multiplexed signals over a serial connection (e.g., over a serial optical connection).

In alternative embodiments other non-conductive formats and a corresponding non-conductive communication link 250 may be used. In one embodiment, converter 135 is a wireless network adapter such as a Wi-Fi® adapter or other wireless local area network (WLAN) adapter. Converter 235 may also be a Zigbee® module, a Bluetooth® module, or other type of wireless radio frequency (RF) communication module. Converter 235 may also be a near field communication (NFC) module, an infrared module, or other type of module.

Switching module 210 includes a second converter 215 that is configured to convert received non-conductive switching signals (e.g., optical switching signals) back into a conductive format (e.g., into electrical switching signals). In one embodiment, the electrical switching signals are 4-20 milliamp signals and/or 0-24 Volt AC signals. Converter 215 may be the same type of converter as converter 235. For example, if converter 235 is an optical converter, then converter 215 would also be an optical converter. Similarly, if converter 235 is a Wi-Fi adapter, then converter 215 would also be a Wi-Fi adapter.

In one embodiment, converter 215 has a separate line to each of switches 220, 221, 222 and 223. Switches 220-223 may be switching relays, silicon-controlled rectifiers (SCRs), transistors, thyristors, triacs, or other switching devices. Converter 215 converts the received switching signal and then outputs an electrical switching signal on a line connected to a switch to which the electrical switching signal was directed. The electrical switching signal causes the appropriate switch to switch on and off in accordance with the switching signal. Thus, the external controller 232 may perform real time (or near real time) control of the switches from outside of the RF environment 205. Each switch receives an unmodulated power and outputs a modulated power, where a modulation of the modulated power is based on switching performed by the switch. The switches may modulate, for example, an output voltage.

In the illustrated embodiment, switching module 210 includes four switches 220, 221, 222, 223. Each of the switches 220-223 is coupled to a different heating element 225, 226, 227, 228 that heats a different temperature zone of a four zone electrostatic chuck. However, more switches and heating elements may be used to add additional temperature zones to the electrostatic chuck. Similarly, fewer switches and heating elements may be used if fewer than four temperature zones are desired. In alternative embodiments, switches 220-223 are used to switch on and off other types of elements than resistive heating elements. For example, switches 220-223 may alternative or additionally be used to power heat lamps and/or lasers. Since each switch 220-223 and associated heating element 225-228 shares the single RF filter 230 and does not have its own RF filter, space in a machine (e.g., semiconductor processing equipment) that includes switching system 200 is conserved and additionally costs associated with the additional filters are advantageously mitigated.

In one embodiment, the switching module 210 is housed within an electrically conductive housing (also referred to as an RF housing). The electrically conductive housing may be, for example, a metal box. Components of the switching module 210 may all have the same potential, as previously mentioned. To ensure that the components of the switching module are all at the same potential, the components may be mounted to a circuit board that is approximately centered in the electrically conductive housing such that a spacing from the circuit board and its components to each of the walls of the electrically conductive housing is approximately equal. Additionally, the switching module 210 may not be tied to ground (may not be grounded). Accordingly, no leakage current may be introduced into the switching module 210 by the RF environment.

Figure 3:
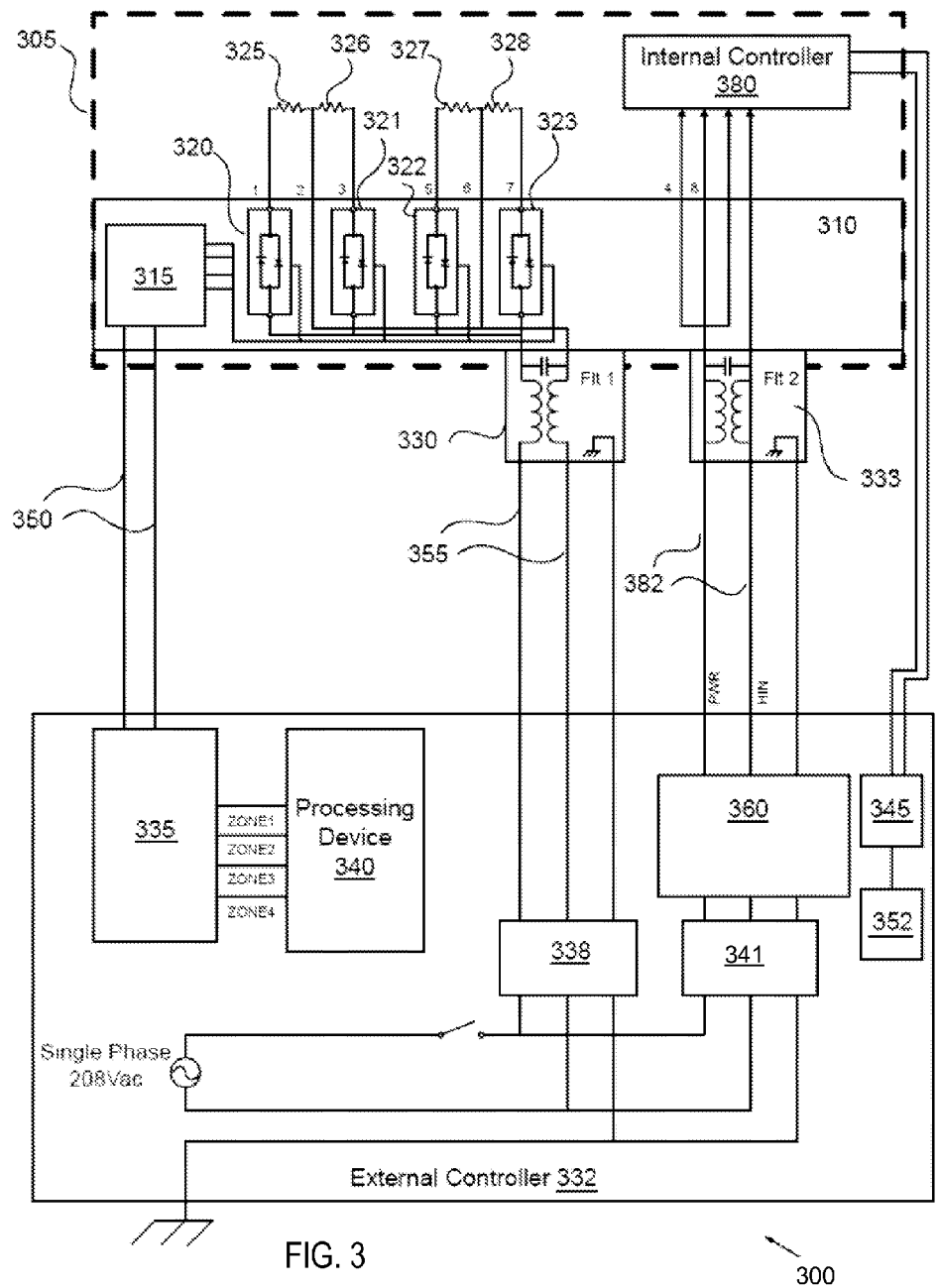
FIG. 3 is a block diagram for a control architecture for devices in an RF environment, in accordance with one embodiment.

FIG. 3 is a block diagram for another switching system 300 including a consolidated filter arrangement for devices in an RF environment, in accordance with one embodiment. Switching system Switching system 300 is similar to switching system 200 of FIG. 2, but additionally includes components for controlling internal controller 380 that includes one or more processing devices (nor shown) that can receive instructions from external controller 332 and then control additional components within an RF environment 305 independent of external controller 332.

Control architecture 300 includes processing device 240 that generates electrical switching signals that are converted into non-conductive switching signals by a converter 335 and sent over a non-conductive communication link 350 to a converter 315 in switching module 310. Converter 315 converts the non-conductive switching signals back into electrical switching signals and sends the electrical switching signals to designated switches 320, 321, 322, 323 for controlling power to heating elements 325, 326, 327, 328. Power is delivered to the heating elements 325-328 over a power line 355 and through a single RF filter 330. A circuit breaker 338 is used to protect components connected to power line 355.

Internal controller 380 also resides in the RF environment 305. The internal controller 380 includes one or more processing devices that are capable of receiving instructions from external controller 332 and then executing those instructions to control one or more elements or components inside the RF environment 305. For example, internal controller 380 may be used to control one or more auxiliary heating elements.

Internal controller 380 may be coupled to a power line 382 through a single RF filter 333. Power line 382 may deliver much lower power than power line 355. For example, power line 355 may provide a power of up to about 900 Volts (V) AC. In contrast, power line 382 may provide a power of about 5-24 Volts DC. Accordingly, external controller 332 may include a power supply 360 that receives up to 900 Volts input and provides 5-24 V as an output. A circuit breaker 341 may protect the power supply 360, RF filter 333 and internal controller 380.

External controller 332 may additionally include an additional processing device 352 for generating commands that may be used to control internal controller 380. Processing device 352 may be the same as or different from processing device 340. Processing device 352 may be coupled to a converter 345 that converts commands from a first format that is transmissible over a conductive communication link into a second format that is transmissible over a non-conductive communication link. Alternatively, processing device 352 may be coupled to converter 335. In another embodiment, processing device 340 may generate the commands for controlling internal controller 380.

Figure 4:
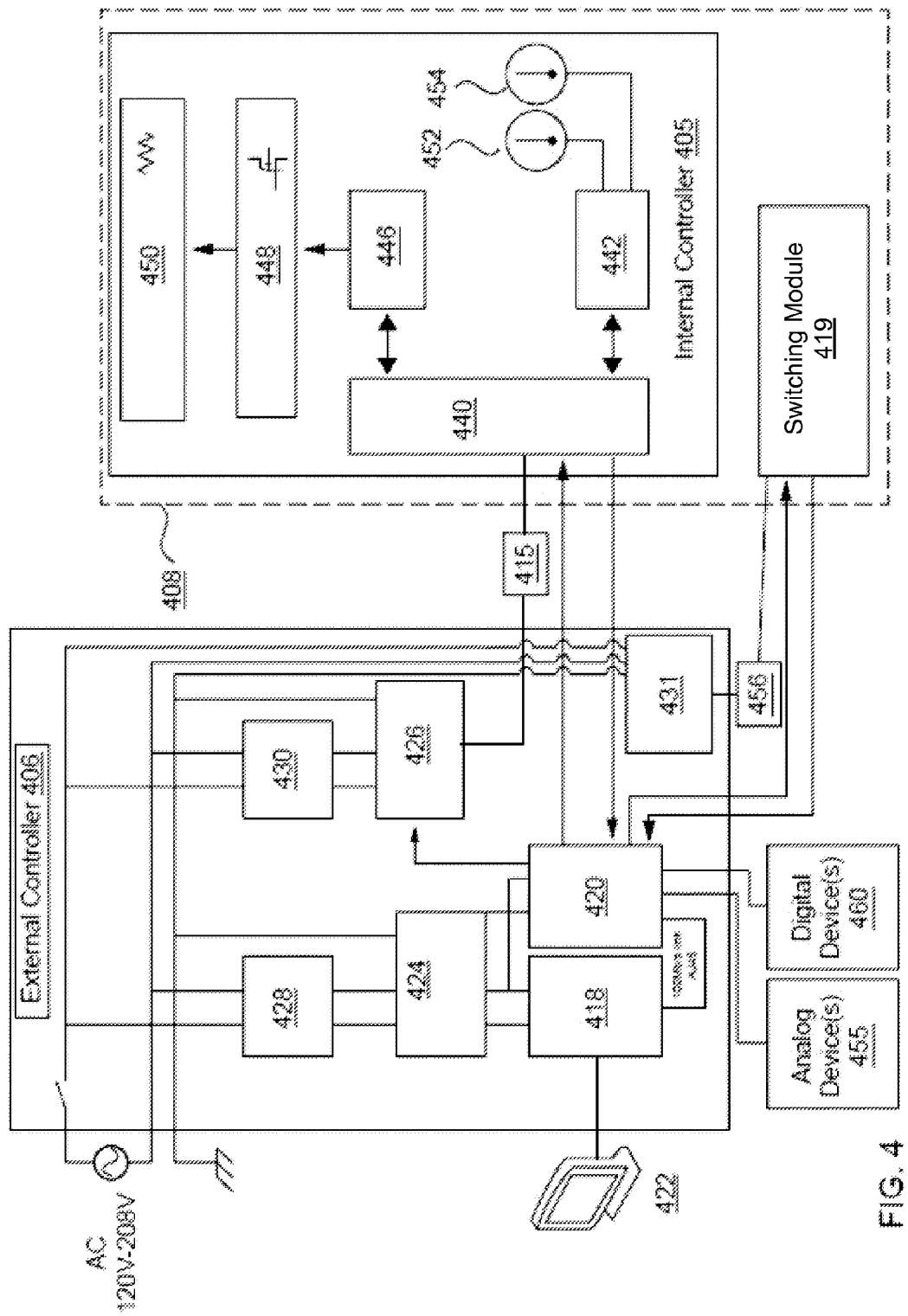
FIG. 4 is a block diagram of another control architecture for devices in an RF environment, in accordance with one embodiment.

FIG. 4 is a block diagram of a control architecture 400 for devices in an RF environment, in accordance with one embodiment. The control architecture 400 includes an external controller 406 that resides outside of an RF environment 408 and an internal controller 405 that resides inside of the RF environment 408. The control architecture 400 may also include one or more analog devices 455 and/or digital devices 460 that are external to the RF environment. The control architecture 400 may also include a switching module 419 that is disposed within the RF environment 408.

The external controller 406 includes a first power supply 424 that powers components of the external controller 406 and a second power supply 426 that powers the internal controller 405. The external controller 406 may additionally include a third power supply 431 that powers switching module 419. The first power supply 424 is coupled to a power source through a first circuit breaker 428 and the second power supply 426 is coupled to the power source through a second circuit breaker 430. Similarly, third power supply 431 may be coupled to the power source via a third circuit breaker (not shown).

A single RF filter 415 separates the second power supply 426 from the internal controller 405. Similarly, a single RF filter 456 may separate the third power supply 431 from switching module 419. The RF filters 415 and 456 filter out RF noise introduced to a power line by the RF environment 408 to protect the external controller 406.

The external controller 406 further includes a first processing device 418 and a second processing device 420, both of which are powered by first power supply 424. The first and second processing devices 418, 420 may be PID controllers, microprocessors, PID microprocessors, central processing units, ASICs, FPGAs, DSPs, or the like. In one embodiment, first processing device 418 is a general purpose processor (e.g., an X86 based processor) and second processing device is a reduced instruction set (RISC) processor (e.g., an ARM® processor) that includes a digital input, a digital output, an analog input and an analog output.

In one embodiment, second processor 420 further includes a converter (not shown) that converts commands and switching signals from a conductive format into a non-conductive format. The non-conductive format may be an optical format (e.g., for infrared communication or fiber optic communication), an RF format (e.g., Wi-Fi, Bluetooth, Zigbee, etc.), an inductive format (e.g., NFC), and so on. In an alternative embodiment, the second processing device 420 may be coupled to one or more converters that perform the conversion between the conductive format and the non-conductive format. First processing device 418 may be coupled to second processing device 420 by an Ethernet connection, a bus, a Firewire connection, a serial connection, a peripheral component interconnect express (PCIe) connection, or other conductive communication interface. The non-conductive communication link between the external controller 406 and the internal controller 405 is not subject to electromagnetic interference or radio frequency (RF) energy. Thus, an RF filter to protect the external controller 406 from RF energy transmission from the internal controller 405 is not used. This frees up more space for routing other utilities. Similarly, the non-conductive communication link between the external controller 406 and the switching module 419 is also not subject to electromagnetic interference or radio frequency (RF) energy.

The first processing device 418 and/or second processing device 420 may be coupled to a main memory (e.g., a random access memory (RAM), Flash memory, etc.), a secondary storage (e.g., a disk drive or solid state drive), a graphics device, etc. over a bus. The first processing device 418 may be coupled to one or more input/output devices 422, and may provide a user interface via the input/output devices 422. Input devices may include a microphone, a keyboard, a touchpad, a touchscreen, a mouse (or other cursor control device), and so on. Output devices may include speakers, a display, and so on. First processing device 418 may provide a user interface that enables a user to select set points and configuration parameters, select process recipes, execute process recipes, etc. to control analog devices 455 and digital devices 460 that are external to the RF environment 408 as well as internal controller 405, switching module 419 and/or other analog and digital devices that are disposed within RF environment 408. The user interface may also display settings of the controlled devices that are internal and external to RF environment 408 as well as sensor readings from both inside of the RF environment 408 and outside of the RF environment 408.

First processing device 418 generates commands and sends the commands to second processing device 420 in accordance with user input. For example, a user may provide input selecting a process recipe and issuing a command to execute the process recipe. Second processing device 420 may generate one or more additional commands based on the command received from first processing device 418. For example, first processing device 418 may send a command to second processing device 420 that causes second processing device 420 to generate first instructions for analog device 455, second instructions for digital device 460, third instructions for internal controller 405 and fourth instructions for switching module 419. The first instructions may be an analog signal that second processing device 420 transmits to analog device 455. The second instructions may be a digital signal that second processing device 420 sends to digital device 460. The third instructions may be a command that is digital and that is formatted in accordance with the inter-integrated circuit (I²C) protocol. Additionally, the third instructions may be formatted for transmission over a non-conductive interface (e.g., may be a digital optical signal). The fourth instructions may be a digital or analog switching signal that will switch on and off one or more switches included in switching module 419. The fourth instructions may be formatted for transmission over a non-conductive interface (e.g., may be an optical switching signal). Accordingly, second processing device 420 is capable of generating commands for controlling multiple different types of digital and analog devices that are both inside RF environment 408 and outside RF environment 408.

Internal controller 405 includes a converter 440 that is configured to convert received commands and other signals from the non-conductive format into a conductive format. For example, internal controller 405 may be an optical converter that converts received optical signals into corresponding electrical signals. The received signals may be analog signals and/or digital signals.

Internal controller 405 further includes one or more pulse width modulation (PWM) circuits or chips 446 coupled to converter 440. Converter 440 sends commands to the PWM circuits 446 after converting the commands from the non-conductive format into the conductive format. The commands may be commands to change set points of one or more pins or outputs of the PWM circuits and/or to activate or deactivate the one or more pins or outputs of the PWM circuits. Each PWM circuit may include multiple pins or outputs, each of which is coupled to switching device, such as a transistor, thyristor, triac, or other switching device 448. The switching device 448 may be, for example, a sinking metal-oxide-semiconductor field effect transistor (MOSFET).

The PWM circuit 446 may turn on or off one or more switching devices 448 in accordance with a configuration of the PWM circuit 446. The PWM circuit 446 may control at least one or more of the duty cycle, voltage, current, or duration of power applied to one or more elements 450. In one embodiment, a PWM circuit 446 receives a command that sets a duty cycle of a pin or output of the PWM circuit 446. The PWM circuit 446 then turns on and off the switching device 448 according to the set duty cycle. By increasing and decreasing the duty cycle, the PWM circuit 446 may control an amount of time that the switching device 448 is turned on verses the amount of time that the switching device 448 is turned off. Switching device 448 may be coupled to a power line that runs through filter 415, and may accordingly provide power to an element 450 when turned on. By controlling the duty cycle of the switching device 448, the amount of power delivered to the element 450 may be controlled to a high degree of accuracy. The element 450 may be, for example, a resistive heating element, a heat lamp, a laser, etc.

As mentioned, internal controller 405 may include multiple PWMs 446, and each PWM 446 may control multiple switching devices (e.g., transistors, thyristors, triacs, etc.) and elements coupled to those switching devices. The PWMs 446 may each receive operating set points for each of their controlled elements, and may then control those elements accordingly. Even if a connection to the external controller 406 is lost, the PWM circuits 446 may continue to control the elements without interruption.

In one embodiment, each element 450 is an auxiliary heating element of an electrostatic chuck. The PWM circuits 446 may regulate the temperature of the auxiliary heating elements (also referred to as auxiliary heaters) independent of the temperature of other auxiliary heating elements. The PWM circuits 446 may toggle the on/off state or control the duty cycle for individual auxiliary heating elements. Alternately or additionally, the PWM circuits 446 may control the amount of power delivered to the individual auxiliary heating elements. For example, a PWM 446 may provide one or more auxiliary heating elements ten watts of power, other auxiliary heating elements nine watts of power, and still other auxiliary heating elements one watt of power.

Each PWM 446 may be programmed and calibrated by measuring the temperature at each auxiliary heating element. A PWM 446 may control the temperature of an auxiliary heating element by adjusting the power parameters for individual auxiliary heating elements. In one embodiment, the temperature may be regulated with incremental power increases to the auxiliary heating elements. For example, a temperature rise may be obtained with a percentage increase, for example 9% increase, in the power supplied to an auxiliary heating element. In another embodiment, the temperature may be regulated by cycling the auxiliary heating element on and off. In yet another embodiment, the temperature may be regulated by a combination of cycling and incrementally adjusting the power to each auxiliary heating element. A temperature map may be obtained using this method. The map may correlate the temperature to the power distribution curve for each auxiliary heating element. Thus, the auxiliary heating element may be used to generate a temperature profile on the substrate based on a program regulating power settings for the individual auxiliary heating elements. The logic can be placed directly in the PWM circuit 446, in another processing device (not shown) that is included in internal controller 405, or in external controller 406.

In one embodiment, internal controller 405 additionally includes one or more sensors, such as first sensor 452 and second sensor 454. The first sensor 452 and second sensor 454 may be analog sensors, and may be connected to an analog to digital converter 442, which may convert analog measurement signals from the first sensor and second sensor into digital measurement signals. Converter 440 may then convert the digital electrical measurement signals into digital optical measurement signals or other measurement signals transmissible over the non-conductive communication link. Alternatively, the first sensor 452 and/or second sensor 454 may provide analog measurement signals directly to converter 440, and converter 440 may convert the analog measurement signals into the form that is transmissible over the non-conductive communication link. The first sensor 452 and/or second sensor 454 may alternatively be digital sensors that output a digital measurement signals to converter 440.

Second processing device 420 may receive the measurement signals and convert them from the format transmissible over the non-conductive interface back into electrical measurement signals. Second processing device 420 may then provide the electrical measurement signals to first processing device 418, which may perform one or more operations based on the electrical measurement signals. The operations performed by the first processing device 418 may depend on the type of sensor measurements and/or the values of the measurements. For example, responsive to receiving temperature measurements, first processing device 418 may determine that the heat output by one or more heating elements should be increased or decreased. First processing device may then generate a command to increase or decrease the heat output by the one or more heating elements and provide the command to second processing device, as described above. In another example, responsive to receiving an unexpectedly high current measurement, first processing device 418 may shut down manufacturing equipment. Other actions may also be performed.

In one embodiment, the components of internal controller 405 are mounted to a circuit board (e., a printed circuit board (PCB)). The circuit board may be housed in an electrically conductive housing that is inside of the RF environment. The electrically conductive housing may be, for example, a metal box. The circuit board and all of its components may be maintained at the same potential. Additionally, the circuit board is not grounded. The circuit board (and its elements) may have an equal spacing to walls of the electrically conductive housing. The equal spacing ensures that all areas of the circuit board have the same potential and leakage capacitance and further ensures that no leakage current will be introduced to the circuit board. The circuit board may be centered in the electrically conductive housing using a dielectric material such as standoffs made of Teflon® or other non-conductive plastic. Accordingly, the internal controller 405 and its components (e.g., the PWM circuits) are protected from the RF environment, which may be a destructive RF environment.

Figure 5:
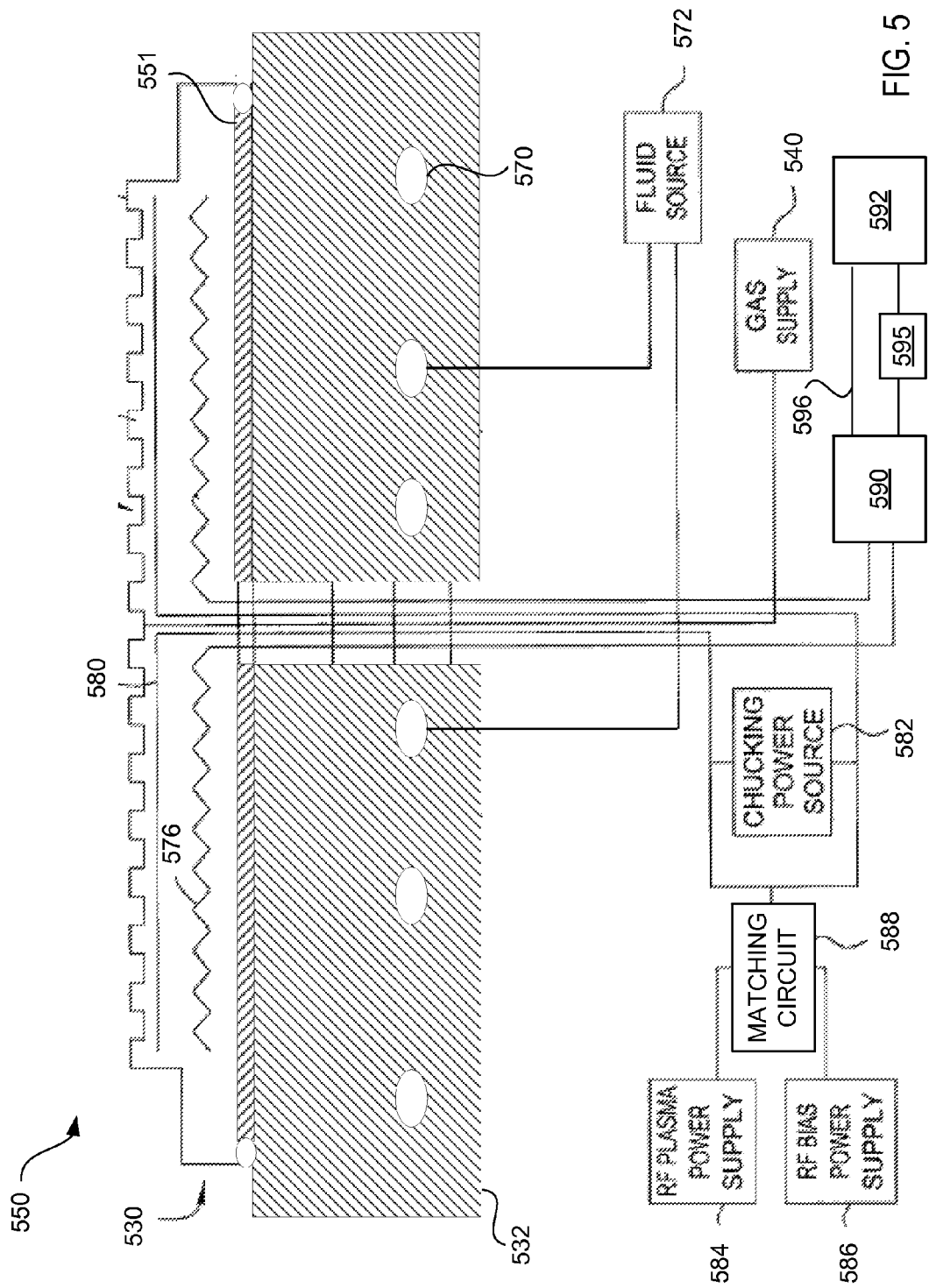
FIG. 5 is a cross sectional schematic side view of a substrate support assembly, in accordance with one embodiment.

FIG. 5 depicts a sectional side view of one embodiment of an electrostatic chuck assembly 550. The electrostatic chuck assembly 550 includes a puck 530 made up of a dielectric material (e.g., a ceramic such as AlN, SiO2, etc.). The puck 530 includes clamping electrodes 580 and one or more heating elements 576. The clamping electrodes 580 are coupled to a chucking power source 582, and to an RF plasma power supply 584 and an RF bias power supply 586 via a matching circuit 588. The heating elements 576 may be screen printed heating elements or resistive coils.

The heating elements 576 are electrically connected to a switching module 590. Switching module 590 includes a separate switch for each of the heating elements 576. Each switch is connected to the same power source via a single power line that includes a single RF filter 595 that filters out RF noise introduced to the power line by numerous components that produce RF signals. The switching module 590 is further connected to an external controller 592 via an optical interface 596 that is not subject to RF interference. External controller 592 may provide a separate switching signal to each of the switches in switch module 590 to control the heating elements 576.

The puck 530 is coupled to and in thermal communication with a cooling plate 532 having one or more conduits 570 (also referred to herein as cooling channels) in fluid communication with a fluid source 572. The cooling plate 532 is coupled to the puck 530 by multiple fasteners and/or by a silicone bond 551. A gas supply 540 provides a gas (e.g., a heat conductive gas) through holes in the puck 530 into a space between a surface of the puck 530 and a supported substrate (not shown).

Figure 6:
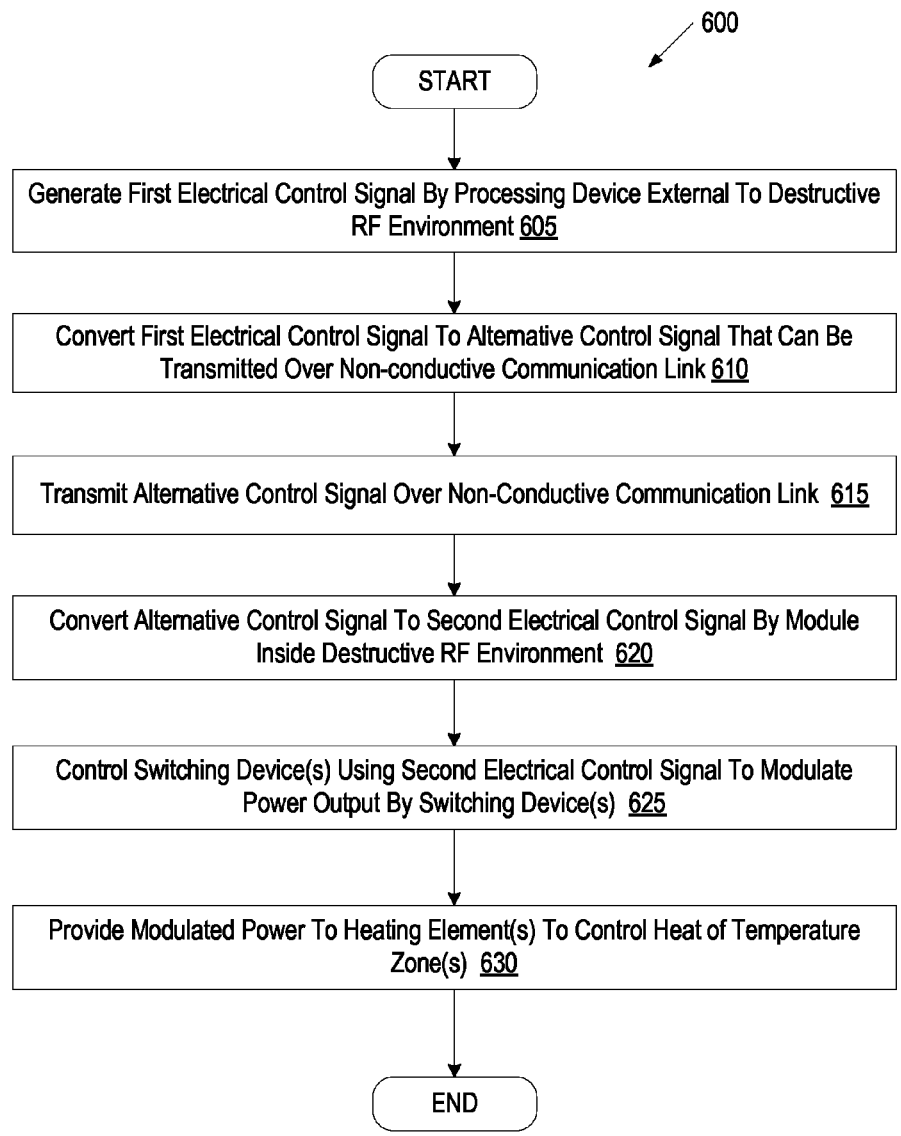
FIG. 6 is a flow diagram of one embodiment of a method for operating multiple elements in an RF environment during a process.

FIG. 6 is a flow diagram of one embodiment of a method 600 for operating multiple elements in an RF environment during a process. At block 605 of method 600, a processing device external to an RF environment (e.g., to a destructive RF environment) generates a first electrical control signal for one or more switching devices of a switching module that is inside of an RF environment. The first electrical control signal may be an electrical switching signal. The first electrical control signal may be generated by the processing device based on commands received from a user and/or based on a process recipe.

At block 610, a converter coupled to the processing device converts the first electrical control signal into an alternative format control signal that can be transmitted over a non-conductive communication link. For example, converter may be an optical converter that converts the electrical switching signal into an optical switching signal. Alternatively, the converter may convert the electrical control signal into an RF control signal, an inductive control signal, or other control signal. At block 615, the converter transmits the alternative format control signal to the switching module over a non-conductive communication link. The non-conductive communication link may be, for example, a fiber optic interface.

At block 620, a second converter in the switching module converts the alternative format control signal back into an electrical control signal. For example, the second converter may convert an optical switching signal into a second electrical control signal. At block 625, the second converter provides the second electrical control signal to one or more switching devices (e.g., switches). Thus, the second electrical control signal is used to switch on and off the one or more switches. By controlling the amount of time that the switches are on verses the amount of time that the switches are off (the duty cycle of the switches), an amount of power that is provided to one or more elements coupled to the switches may be controlled. In one embodiment, at block 630 the switching devices provide a modulated power to one or more heating elements to control the heat of associated temperature zones. The power may be provided by a power line that is coupled to the switching devices through a single RF filter that filters out RF noise introduced into the power line by the RF environment.

Figure 7:
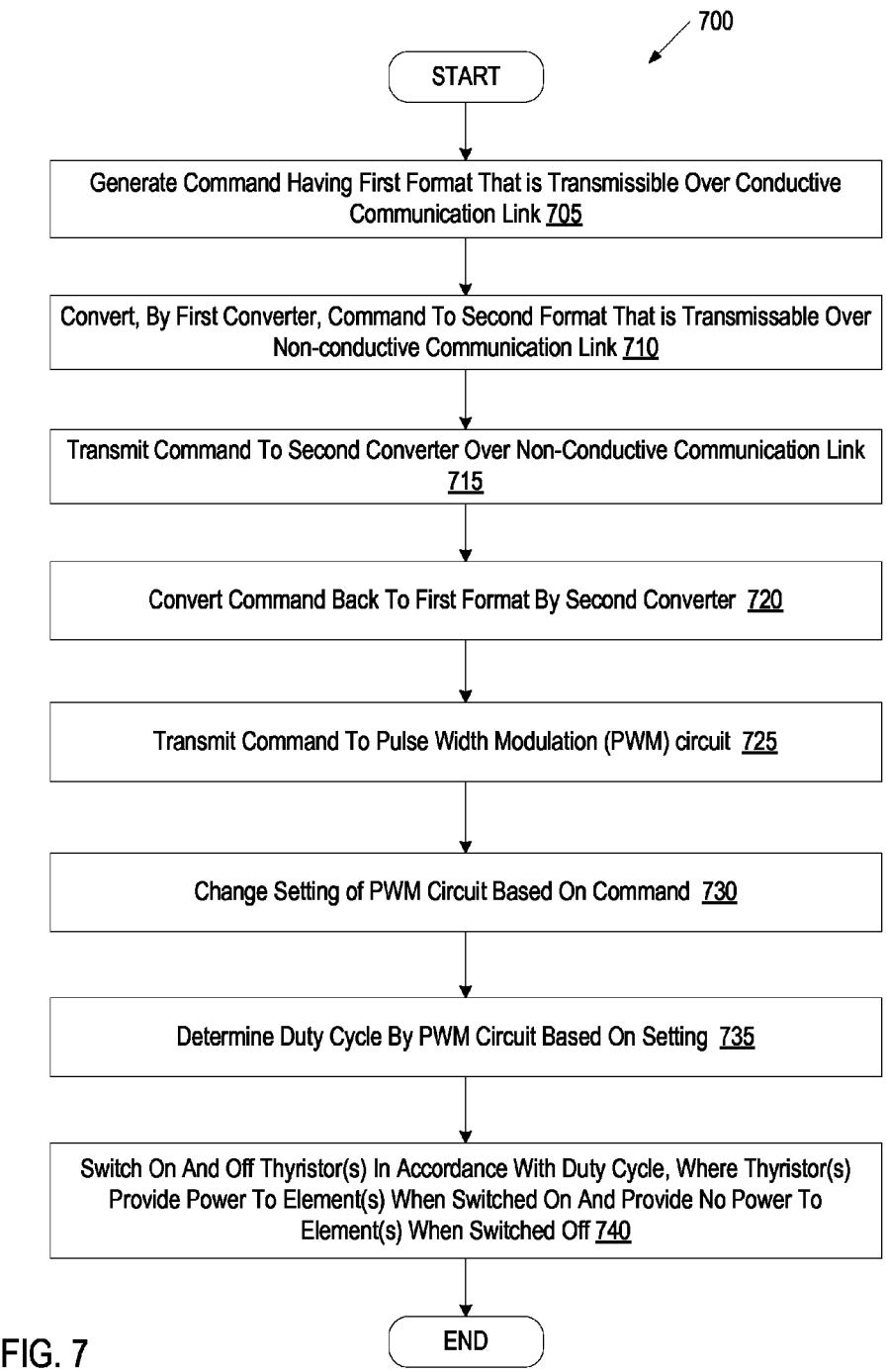
FIG. 7 is a flow diagram of another embodiment of a method for operating multiple elements in an RF environment during a process.

FIG. 7 is a flow diagram of another embodiment of a method 700 for operating multiple elements in an RF environment during a process. At block 705 of method 700, a processing device that is outside of an RF environment generates a command having a first format that is transmissible over a conductive communication link. The processing device may be a first processing device of an external controller. At block 710, a converter converts the command from the first format into a second format that is transmissible over a non-conductive communication link. The converter may be a second processing device of the external controller. In one embodiment, the converter generates a new command based on the command received from the processing device. The original command may have a first protocol (e.g., an Ethernet protocol) and the new command may have a second protocol (e.g., an I$^2$C protocol, another multi-master multi-slave single ended computer bus protocol, a semiconductor equipment and materials international equipment communications standard/generic equipment model (SECS/GEM) protocol, or some other protocol).

At block 715, processing logic transmits the command (or the new command) to a second converter of an internal controller that is inside of the RF environment. At block 720, the second converter converts the command from the second format back into the first format. At block 725, the second converter transmits the command to a pulse width modulation circuit or to another processing device.

At block 730, a setting of the PWM circuit (or other processing device) is changed based on the command. At block 735, the PWM circuit (or other processing device) determines a duty cycle to apply to an output or pin of the PWM circuit associated with the setting. The PWM circuit may then switch on and off one or more transistors, thyristors, triacs, or other switching devices coupled to the output or pin in accordance with the determined duty cycle. The switching devices are coupled at one contact to a power line that provides power from outside of the RF environment and at another contact to an element such as a resistive heating element. The power line may include a single RF filter that filters out RF noise introduced to the power line by the RF environment to protect, for example, the external controller. By changing the duty cycle for the elements the PWM circuit may modulate a power that is provided to the one or more elements. By modulating the power, the PWM circuit may control the heat output by a resistive heating element, the intensity output by a laser, the heat output by a heat lamp, and so on.

Figure 8:
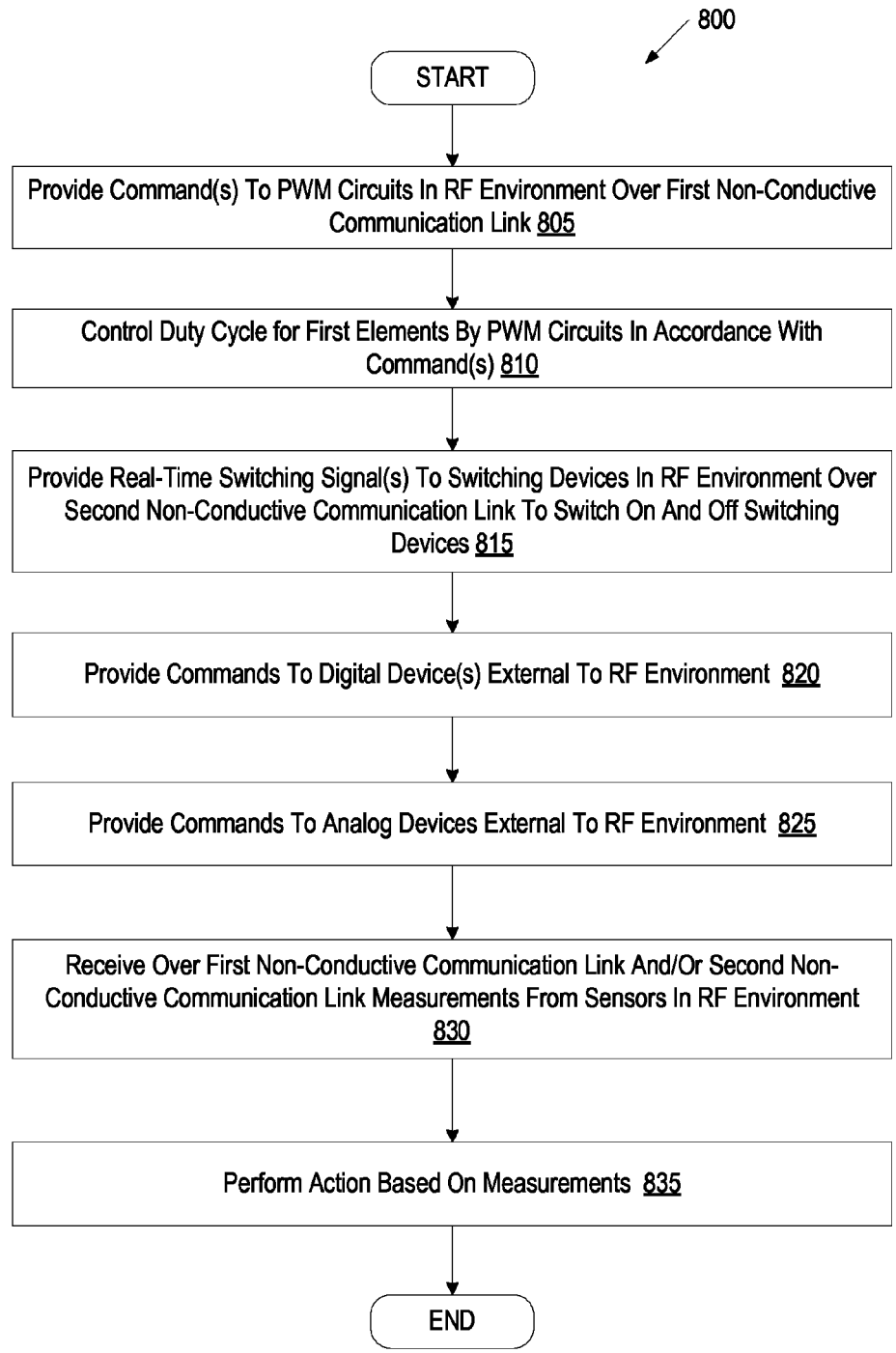
FIG. 8 is a flow diagram of another embodiment of a method for operating multiple elements in an RF environment during a process.

FIG. 8 is a flow diagram of another embodiment of a method 800 for operating multiple elements in an RF environment during a process. At block 805 of method 800, an external controller that is outside of an RF environment provides one or more commands to PWM circuits of an internal controller that resides within the RF environment over a first non-conductive communication link. At block 810, the PWM circuits in the internal controller control duty cycles of one or more elements in the RF environment in accordance with the commands. The commands may be instructions to change settings of one or more outputs for one or more of the PWM circuits. The PWM circuits may change settings based on the received commands, and may control the duty cycle without receiving any further instructions from the external controller.

At block 815, the external controller provides real-time switching signals to switching devices in a switching module that resides in the RF environment over a second non-conductive communication link. The first and second non-conductive communication links may be the same type of communication link or different types of communication links. For example, the first non-conductive communication link may be a fiber optic interface and the second non-conductive communication link may be a Wi-Fi network interface. The real-time switching signals may be analog or digital signals that will cause a receiving switching device to switch on and off based on the signals. For example, the switching device may connect an input terminal to an output terminal when a first signal over a threshold value is received and may disconnect the input and output terminals when no signal is received or when a signal that has a value lower than the threshold is received. The switching device may accordingly switch on and off one or more elements connected to an output terminal of the switching device in accordance with the real-time switching signal. Notably, at block 815 the actual decision of when to switch on and off elements is being made at the external controller that is outside of the RF environment. In contrast, at block 810 the PWM circuits that reside in the internal controller inside of the RF environment are making the actual decisions on when to switch on and off elements.

At block 820, the external controller provides commands to one or more digital devices that are external to the RF environment. An example of digital devices external to the RF environment are devices having switchable digital outputs to enable or disable power to other devices or elements.

At block 825, the external controller provides commands to one or more analog devices that are external to the RF environment. An example of analog devices external to the RF environment are devices having switchable analog input to regulate a power supply.

At block 830, the external controller receives measurements from one or more sensors that are inside the RF environment. The measurements may be received over the first non-conductive communication link and/or over the second non-conductive communication link. The sensors may be, for example, temperature sensors, current sensors, voltage sensors, power sensors, flow meters, or other sensors. The measurements may be generated by the sensors in the RF environment and sent to a converter of the switching module or a converter of the internal controller. The converter may convert the measurements from an analog or digital electrical signal into the non-conductive format. A converter at the external controller may convert the received measurements back into electrical signals, and may then act on the measurements at block 835. Examples of actions that the external controller may perform include terminating a process, generating an alarm, generating and transmitting a notification, displaying a value in a user interface, recording the measurements, and so on.

While the foregoing is directed to implementations of the present invention, other and further implementations of the invention may be devised without departing from the basic scope thereof, and the scope thereof is determined by the claims that follow.

What is claimed is:

1. A system comprising:
   a first plurality of elements disposed in a radio frequency (RF) environment;
   a second plurality of elements disposed outside of the RF environment;
   a plurality of switching devices disposed in the RF environment, wherein each of the plurality of switching devices are operably coupled to a corresponding element of the first plurality of elements to control power to the corresponding element, wherein the plurality of switching devices are coupled to a power line that is to provide power from outside the RF environment;

a filter, coupled to the power line, to filter out RF noise introduced into the power line by the RF environment; and a converter disposed in the RF environment and operably coupled to the plurality of switching devices to provide a non-conductive communication link between the plurality of switching devices and a controller outside of the RF environment, the controller comprising a real-time logic control, wherein the controller is to receive a process recipe via user input and is to control the first plurality of elements and the second plurality of elements substantially simultaneously based on the process recipe.

2. The system of claim 1, further comprising an electrically conductive housing for the plurality of switching devices and the converter, wherein the electrically conductive housing substantially encloses the plurality of switching devices and the converter and maintains an approximately equal potential for the plurality of switching devices and the converter.

3. The system of claim 2, wherein the plurality of switching devices and the converter are ungrounded and have an approximately equal spacing to walls of the housing to maintain the approximately equal potential and to avoid leakage current.

4. The system of claim 1, wherein the plurality of switching devices are to receive an unmodulated power on the power line and are to output a modulated power to the plurality of elements, wherein a modulation of the modulated power is based on switching performed by the plurality of switching devices.

5. The system of claim 4, wherein the plurality of switching devices are to modulate an output voltage.

6. The system of claim 1, wherein the plurality of elements comprise at least one of resistive heating elements, heat lamps or lasers.

7. The system of claim 1, wherein the non-conductive communication link comprises a fiber optic connection.

8. The system of claim 7, wherein the converter comprises an optical converter that is to convert an optical control signal into an electrical control signal and to send the electrical control signal to at least one of the plurality of switching devices.

9. The system of claim 1, further comprising:

the controller; and an additional converter disposed outside of the RF environment and electrically coupled to the controller to receive an electrical control signal from the controller, convert the electrical control signal into a second control signal for transmission over the non-conductive communication link, and transmit the second control signal to the converter over the non-conductive communication link.

10. The system of claim 1, wherein the filter is a single filter, and wherein power is provided to the plurality of switching devices through the single filter.

11. The system of claim 1, wherein the RF environment is a destructive RF environment that is capable of damaging electrical components exposed to the RF noise of the RF environment.

* * * * *